United States Patent
Moore et al.

(10) Patent No.: US 7,475,215 B2
(45) Date of Patent: Jan. 6, 2009

(54) IDENTIFICATION OF UNCOMMITTED MEMORY BLOCKS DURING AN INITIALIZATION PROCEDURE

(75) Inventors: Derick Moore, Colorado Springs, CO (US); Lawrence Rawe, Colorado Springs, CO (US); Roy Wade, Colorado Springs, CO (US)

(73) Assignee: LSI Corporation, Milpitas, CA (US)

(*) Notice: Subject to any disclaimer, the term of this patent is extended or adjusted under 35 U.S.C. 154(b) by 299 days.

(21) Appl. No.: 11/530,397

(22) Filed: Sep. 8, 2006

(65) Prior Publication Data

US 2008/0065852 A1    Mar. 13, 2008

(51) Int. Cl.
 *G06F 12/00* (2006.01)
(52) U.S. Cl. ...................................................... 711/170
(58) Field of Classification Search ........................ None
See application file for complete search history.

(56) References Cited

U.S. PATENT DOCUMENTS

| | | | | |
|---|---|---|---|---|
| 6,424,428 | B1* | 7/2002 | Takeuchi | 358/1.16 |
| 6,480,912 | B1* | 11/2002 | Safi | 710/57 |
| 7,293,149 | B2* | 11/2007 | Lo | 711/167 |

* cited by examiner

*Primary Examiner*—Hiep T Nguyen
(74) *Attorney, Agent, or Firm*—North, Weber & Baugh LLP

(57) ABSTRACT

An apparatus and method are described for identifying uncommitted memory in a system RAM during an initialization process of a computer system, such as a boot procedure or power-on self test, during which memory management is uncontrolled. In various embodiments of the invention, repeating patterns that are indicative of uncommitted memory blocks are identified within a conventional memory area of the system RAM. At least some of the uncommitted memory blocks are allocated for use by an option ROM or other BIOS data and a table is created identifying these uncommitted memory blocks. After the BIOS code exits the system RAM, the table is used to restore the uncommitted memory blocks into their previous data states.

22 Claims, 4 Drawing Sheets

IDENTIFICATION OF UNCOMMITTED MEMORY BLOCKS DURING AN INITIALIZATION PROCEDURE

BACKGROUND

A. Technical Field

Embodiments of the invention generally relate to computer memory management, and more particularly, to an apparatus and method of identifying uncommitted memory during an initialization procedure during which memory management is uncontrolled.

B. Background of the Invention

A computer system includes a variety of different type of hardware components, including various adapter cards that may be plugged into the computer system. To ensure proper operation of these hardware components, an initialization routine is required within the computer system to inform the computer about the availability and status of all hardware devices connected to it. A Basic Input Output System ("BIOS") containing low-level input/output routines is used to initialize these hardware components when power is first applied to the computer or a power-on self test procedure. In the case of adapter cards, BIOS code is usually stored in an option ROM chip on the card(s). The option ROM chip contains a set of program instructions known as an option ROM BIOS or BIOS image. The BIOS image typically includes a core code having a core configuration utility and a user interface.

FIG. 1 shows a typical layout of a system's Random Access Memory or system RAM 100. During the boot process, the BIOS image or BIOS Data 102 is loaded to a reserved area 101 of the memory 100. This reserved or dedicated area 101 is usually between C000 and F000 hexadecimal address range of the system RAM 100 that is the upper memory area and constrains the size of an option ROM that may be loaded. Conventional memory 102 is also located within the memory 100 that may be committed for various uses. For example, very low memory contains interrupt tables and low level code devoted to time-of-day, system hardware, essential system services, and other purposes.

In this limited memory space, a portion of the BIOS image is further implemented to initialize a host adapter(s) or other component associated with the option ROM BIOS. This dedicated memory is often used in chunks of 16 KB (4000h) resulting in memory blocks within the memory space. In certain situations, a BIOS image may inefficiently use memory blocks resulting in uncommitted or empty blocks within the memory space.

Oftentimes, multiple option ROMs are required to be initialized by the computer system resulting in the limited option ROM reserved memory space to become overburdened. In these events, certain hardware elements may boot-up very slowly or not at all because of capacity problems within the option ROM reserved memory space. As a result, the user may not be able to use certain hardware device or peripherals within the computer system or the hardware may not operate properly.

In order to reduce the likelihood of overburdening an option ROM memory space, designers have allocated larger memory sizes to the option ROM memory space. This larger option ROM memory space presents certain inefficiencies and costs within the system. For example, a larger option ROM memory space requires a more extensive configuration utility. In one implementation, the configuration utility may be designed to manage arrays of multiple disk drives such as RAID, as well as normal individual disk drives, which enabled a user to perform several applications including formatting or verifying a drive. The configuration utility also provides an interface to allow the end users to have a direct control on the drives.

The size of a configuration utility for a large option ROM memory space may approach 256K. This larger utility presents memory allocation problems which may affect compilers and other software codes that typically run in the conventional memory space.

Some vendors provide memory space for making memory allocations sufficient to the peripherals, managing conventional memory and creating configuration utilities of different sizes. For example, on certain IBM compatible platforms, Post Memory Management ("PMM") applications provide this functionality. However, vendors run different versions of the PMM software, which makes it difficult to provide a general request to the system BIOS for managing memory. Further yet, some platforms may still allocate a small amount of memory to BIOS, which may be insufficient for initialization of all the system hardware.

Accordingly, increasing the amount of memory allocated to option ROM memory space introduces inefficiencies within systems and also further increases the cost of providing additional memory.

SUMMARY OF THE INVENTION

The present invention provides a method and apparatus for identifying uncommitted memory blocks in conventional memory area within a system RAM during an initialization process, such as a boot procedure or power-on self test to enable a more efficient use of memory area. Uncommitted memory is intended to include any memory space that may be used to store option ROM data within a system RAM and includes, but is not limited to, free memory blocks within a memory area.

In various embodiments of the present invention, an uncommitted memory identifier module is provided that identifies uncommitted memory space in conventional memory area within a system RAM. The uncommitted memory identifier module analyzes blocks of memory within the limited memory area of the system RAM to identify memory block patterns indicative of uncommitted memory space. In one embodiment of the invention, memory blocks are analyzed to identify repeating patterns within contiguous memory blocks to determine uncommitted memory space.

The uncommitted memory identifier module initially sets limits on the memory analysis in order to minimize the possibility of misidentifying used memory blocks as uncommitted memory space. These limits may include defining boundaries of an Extended Bios Data Area ("EBDA") or setting the location of a stack pointer(s) and end address to set lower and upper limits so that another area, such as one being used by third party applications, is not modified when the BIOS code is stored. A safe margin may also be chosen adjacent to these lower and upper limits. Further yet, a minimal block size threshold may be set that defines a minimum block size of uncommitted memory blocks. One skilled in the art will recognize that other limits may be employed to further aid in the identification of uncommitted memory space.

An available memory block within a system RAM is identified by reading and identifying specific repeating patterns stored in memory blocks within the RAM. In one embodiment of the invention, a first possible memory block is identified and the data pattern therein is used as a "test pattern." One skilled in the art will recognize that various analyzes using this test pattern may further aid in identifying whether the data pattern is unused memory. Contiguous memory blocks are analyzed relative to this test pattern in order to determine whether a repeating pattern is present within the memory space.

The starting address of a possible block of available memory may be incremented by test pattern size in units of byte, word, dword, qword, etc., in order to reach a next block of memory in the system RAM. The combination of these repeating pattern memory blocks is identified as "uncommitted memory."

The further next block may be added to the previous block and collectively identified as "uncommitted memory" provided that the further next block does not conflict with the upper and lower limits. If any block of memory is found to be conflicting with the upper and lower limits, then the address pointer may be set to the end of conflicting range and that address may be incremented by test pattern size.

The repeating pattern of the incremented address may again be read along with the start address and saved as a new test pattern. The new test pattern may be processed in a similar way as explained above and other blocks of unused memory may be identified.

In various embodiments of the invention, one or more tables of patterns and uncommitted memory is maintained that records the free space, the allocation from the free space and the de-allocation for indicating the memory that is again available. When the option ROM code is ready to exit, these tables are used to restore the unused memory into its original condition.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

An apparatus and method are described for identifying uncommitted memory in a system RAM during an initialization process of a computer system, such as a boot procedure or power-on self test, during which memory management is uncontrolled. In various embodiments of the invention, repeating patterns that are indicative of uncommitted memory blocks are identified within a conventional memory area of the system RAM. At least some of the uncommitted memory blocks are allocated for use by an option ROM image or other BIOS data and a table is created identifying these uncommitted memory blocks. After the BIOS code exits the system RAM, the table is used to restore the uncommitted memory blocks into their previous data states.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including storage environments. The embodiments of the present invention may also be present in software, hardware or firmware. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

An apparatus and method are described for identifying available memory within a system RAM during the initialization of a system or hardware element therein. In particular, uncommitted memory blocks within a conventional memory area in the RAM by identifying particular repeating pattern blocks indicative of available memory blocks.

Figure 1:
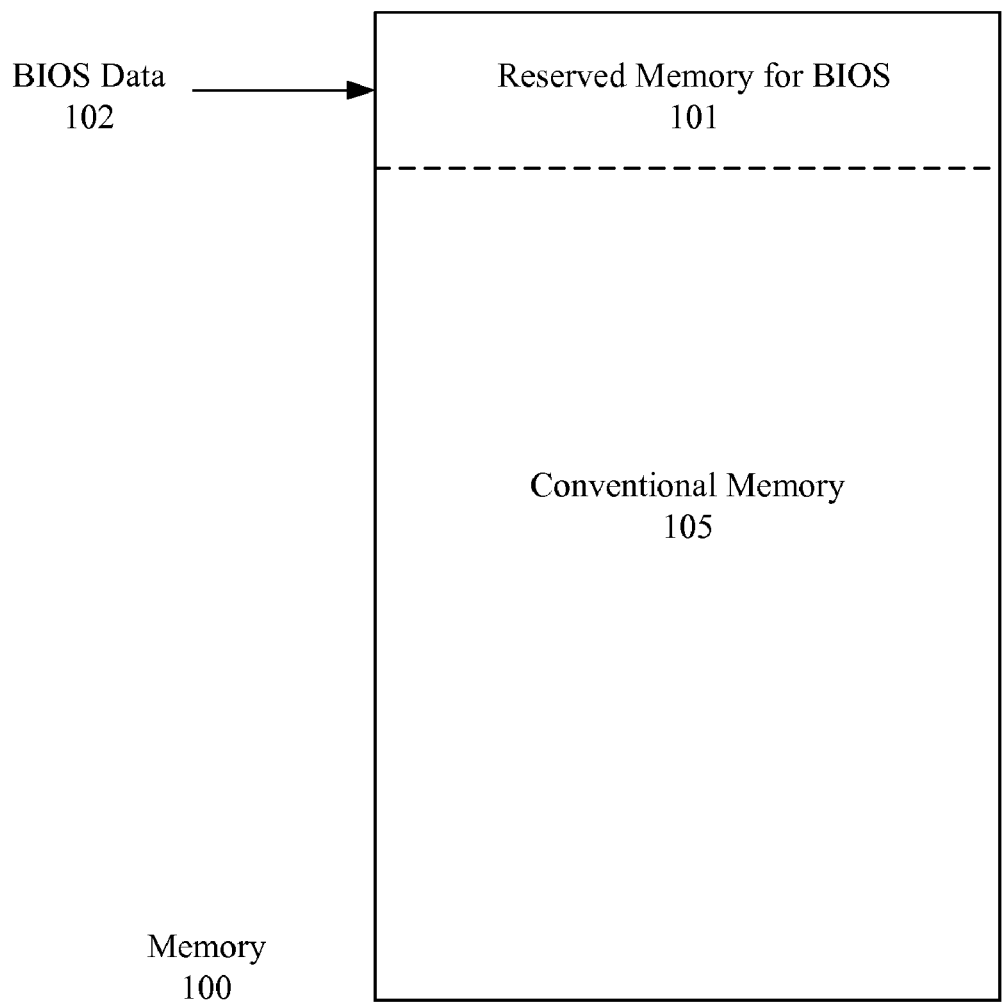
FIG. 1 shows a block diagram of the system RAM having reserved memory space for BIOS data and conventional memory area.
Figure 2:
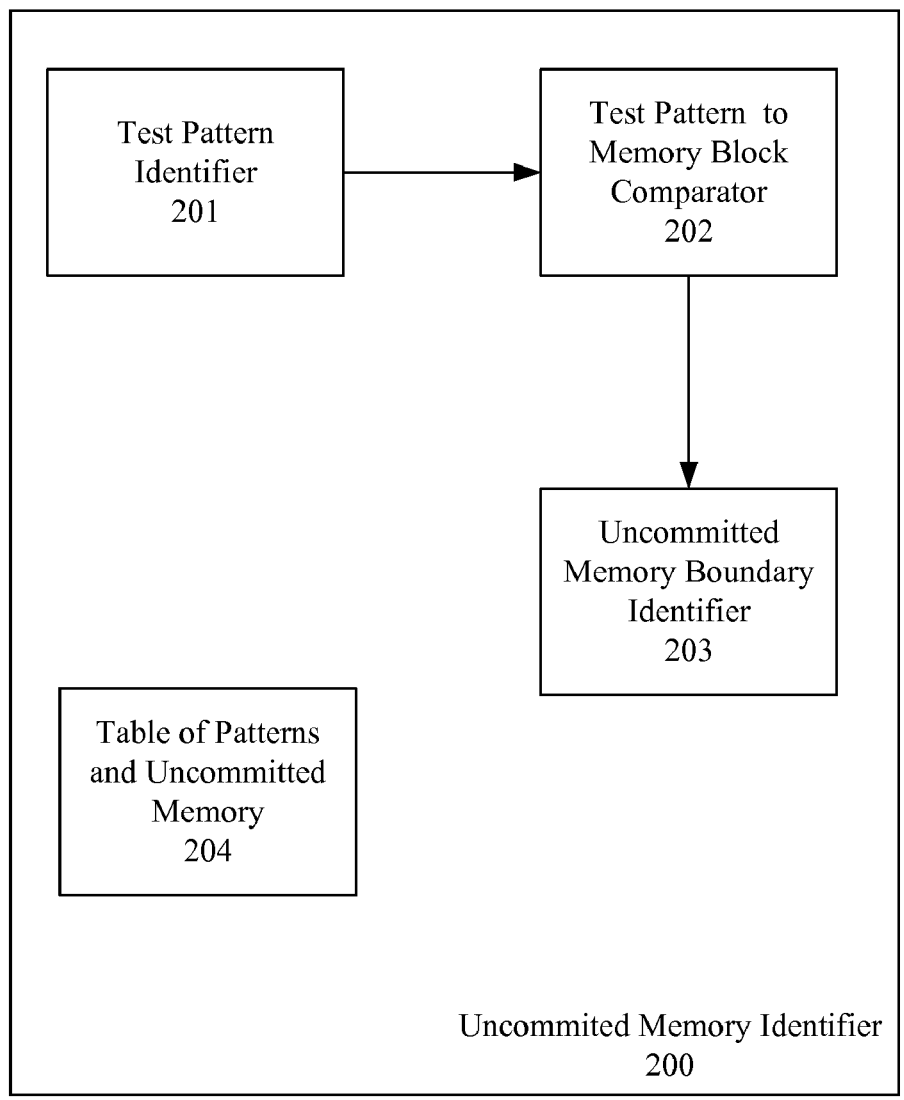
FIG. 2 is a structural representation of memory identifier module that identifies uncommitted memory within conventional memory space according to various embodiments of the invention.

FIG. 2 is a block diagram of an uncommitted memory identifier module 200 that identifies uncommitted memory within a conventional memory area 105 at the time of initialization according to various embodiments of the invention. This module 200 may be located on numerous devices within a system including adapter cards that are plugged into the system and initialized during a system boot procedure. An option ROM image is stored and executed within the memory to enable the related hardware component(s) to be initialized within the system during events such as system boot-ups or "power-on self tests."

Typically, a computer system is single-threaded during a boot-up procedure or a power-on self test. Any unused memory within the system RAM, or particularly the conventional memory area within the RAM, remains available until BIOS code is stored therein and subsequently runs within the computer system. As previously described, the running or operation of this BIOS code initializes hardware(s) so that it functions properly within the computer system.

The identification of sufficient memory within conventional memory area of the RAM is critical so that the BIOS code can be stored therein. Unused memory blocks within this memory area often contain specific repeating patterns. The memory identifier module 200 defines certain search and size limitations within the conventional memory area to ensure that memory blocks are not incorrectly identified as uncommitted memory blocks for BIOS code. For example, a starting and ending address below the EBDA are set, and a stack start and end address are recorded. One skilled in the art will recognize that other memory restrictions may be identified and recorded within various embodiments of the present invention.

A test pattern identifier 201 is provided in the memory identifier module 200 for reading test patterns within the memory. In one embodiment of the invention, a starting address of a first possible block of unused memory is read, identified as a "test pattern," and this address may be then incremented by a test pattern size to reach the next block of the memory. The size of test pattern may be in units of byte, word, dword, qword etc depending upon the type of processing machine being used or other parameter. For example, a 32-bit processing machine may generate a dword pattern so the test pattern length is defined as a dword.

A contiguous memory block is read and may be termed as "read pattern." A test pattern to memory block comparator 202 is provided in the uncommitted memory identifier module 200 to compare the read pattern with the test pattern. If the read pattern is the same as the test pattern, then the address of the next block may further be incremented by the test pattern size to reach the next block of the memory. Otherwise, a new test pattern may be generated in the above-mentioned fashion.

A further next contiguous block may be added to the previous block and collectively identified as the 'uncommitted memory' provided that the further next block does not conflict with the memory limits. This process may be repeated until the last block of memory is reached and analyzed.

If the read pattern is different than the test pattern, then the size of the current block may be checked in the Uncommitted Memory Boundary Identifier 203. If the size of the current block is larger than a minimum size threshold then the start address, the address and the pattern of the current block is recorded and next memory location is analyzed by incrementing the start address by the test pattern size.

In general, a particular pattern is compared to the previous test pattern and contiguous blocks of unused memory are identified until the entire memory is tested. All contiguous blocks of unused memory are treated as one large piece of memory, which can be later segmented in an 8-bit boundary or a 16-bit boundary and so on.

According to various embodiments of the present invention, the uncommitted memory identifier module 200 checks the limits defined within Extended Bios Data Area so that memory allocated to other BIOS code is not inappropriately modified. In one embodiment, a stack pointer is located, a lower limit and an upper limit are set. Thereafter, a safe margin is chosen to allow enough room for the stack pointer to grow. If any block of memory is found to be conflicting with the upper and lower limits, then the address pointer is set to the end of conflicting range and that address is incremented by test pattern size. The repeating pattern of the incremented address is again read along with the start address and saved as a new test pattern. This new test pattern is processed in a similar way as explained above and all blocks of unused memory are identified.

A table of patterns and uncommitted memory 204 is created that records the uncommitted memory space, the allocation of the uncommitted memory space and the de-allocation that shows that the memory is available again. When the BIOS code is ready to exit the allocated memory, these tables are used to restore the uncommitted memory space into its previous data states.

B. Method of Identifying Uncommitted Memory

Figure 3A:
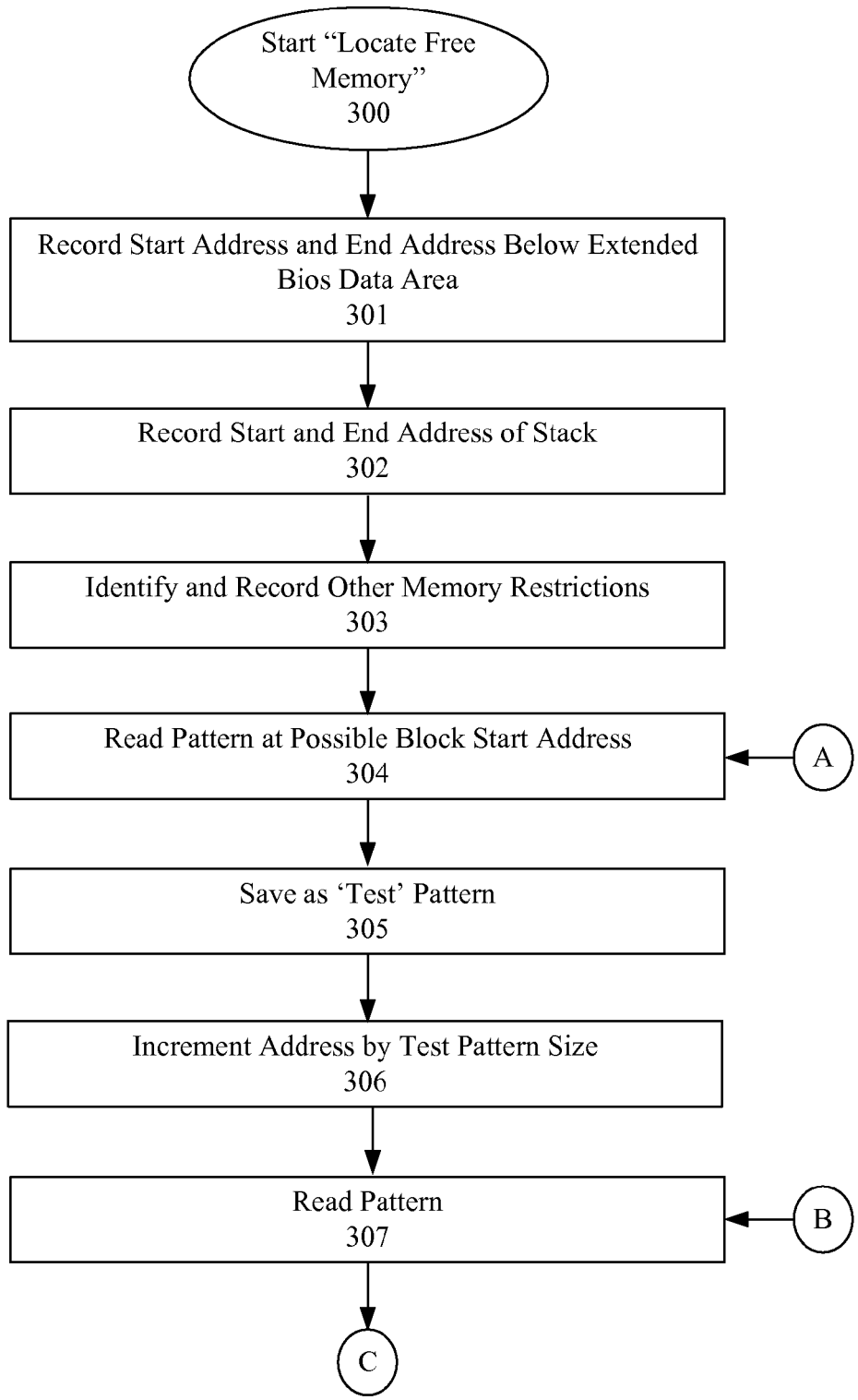
FIGS. 3A and 3B are flowcharts illustrating a method for identifying uncommitted memory within conventional memory space of a system RAM according to various embodiments of the invention.
Figure 3B:
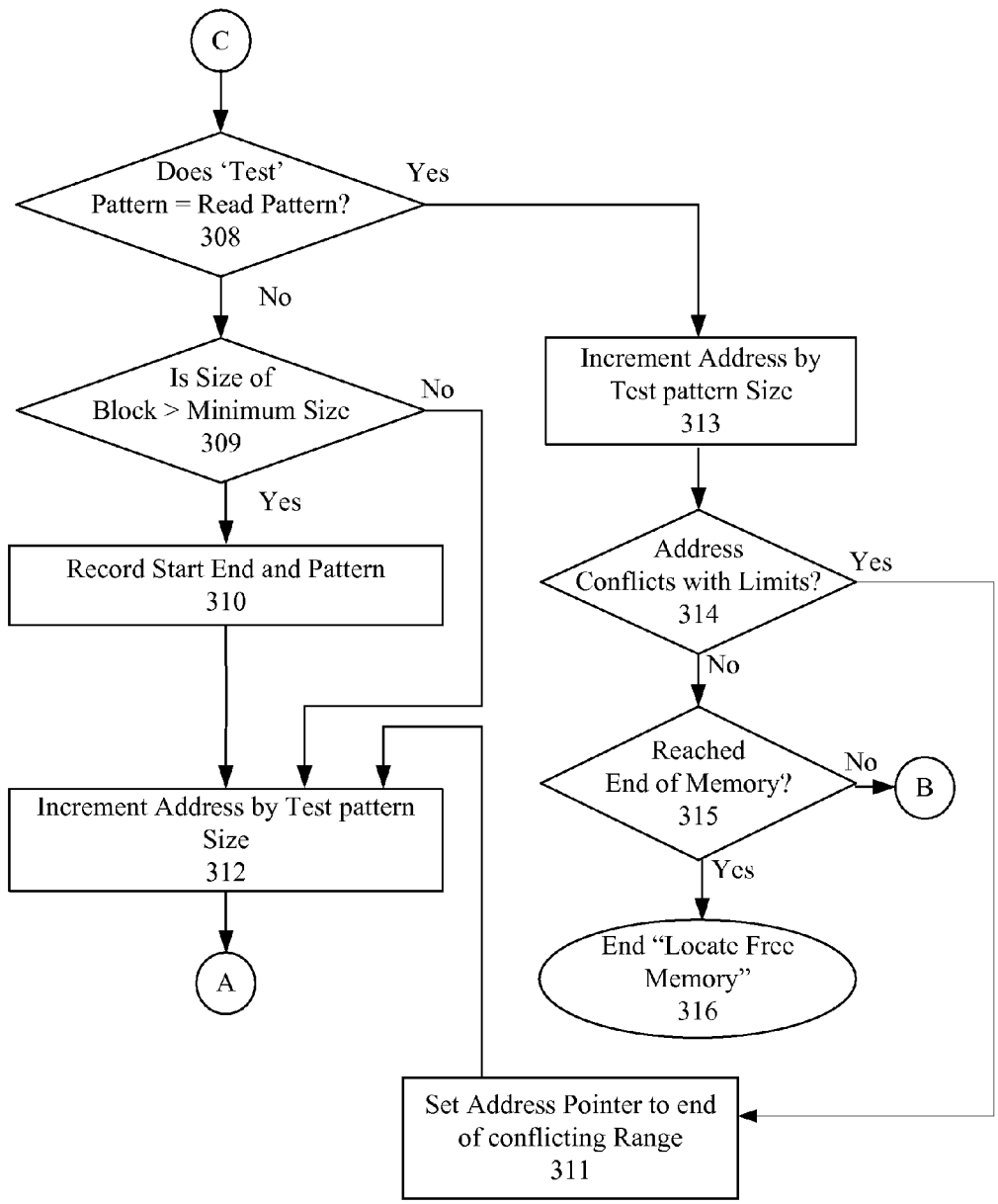

FIGS. 3A and 3B illustrate a method, independent of structure, for identifying uncommitted memory within a conventional memory area according to various embodiments of the invention. As shown in FIG. 3A, the method may be started by running code, in this example "locate free memory," in the conventional memory area of the system RAM at the time of initialization 300. A start address and end address below an Extended Bios Data Area are recorded 301. A stack pointer is located in the RAM and its start and end address is recorded 302. Other memory restrictions or limits may also be recorded 303 when appropriate.

A first possible unused memory block is identified and its pattern is read at its start address 304. The starting and ending address or starting address and length of the first possible block of unused memory is saved as a "test pattern" 305. The starting address may be then incremented by a test pattern size 306 to reach to the next contiguous memory block or location. The pattern stored in the next block or location is then read 307 and called a "read pattern."

The read pattern is compared with the test pattern of the previous contiguous block 308 as shown in FIG. 3B. If the read pattern is different than the test pattern, then the size of the current block is checked 309. If the size of the current block is larger than a predefined minimum size, then the start address, the end address and the pattern of the current block is recorded 310 and next memory location is identified by incrementing the start address by the test pattern size 312. A repeating pattern of the next location is read 304 as illustrated in FIG. 3A. However, when the size of the current block is smaller than the minimum size then next memory location is identified by incrementing the start address by the test pattern size 312 and repeating pattern of the next location is read 304 in a similar fashion as explained above.

If the read pattern is same as the test pattern, then next memory location is identified by incrementing the start address by the test pattern size 313. A check is performed to determine whether any memory location or blocks is conflicting with the limits previously set 314. If any block of memory is found to be conflicting with the upper and lower limits, then the address pointer is set to the end of conflicting range 311 and that address is incremented by test pattern size 312. The repeating pattern of the incremented address is again read along with the start address 304 and saved as a new test pattern 305. If a block of memory does not conflict with the memory limits, then a check is performed to determine whether the entire conventional memory area has been analyzed 315. If any memory block remains to be tested then its pattern is read 307 and compared with the test pattern 308.

The above-explained method is repeated until the code reaches the end of the memory to end the process 316. Thus, a particular test pattern is compared to the previous read pattern and contiguous blocks of unused memory are identified until the entire memory is tested. All contiguous blocks of unused memory are treated as one large piece of unused or uncommitted memory, which can be segmented later as per the requirement.

One skilled in the art will recognize that other factors may be included and integrated within the processes of identify uncommitted memory blocks. For example, null memory blocks may be treated as uncommitted memory blocks that may be combined with repeating pattern blocks in the allocation of memory to the storage of BIOS data. Additionally, various methods may be used to maintain and restore allocated memory blocks after a particular BIOS has been run within a system or hardware initialization.

While the present invention has been described with reference to certain exemplary embodiments, those skilled in the art will recognize that various modifications may be provided. Accordingly, the scope of the invention is to be limited only by the following claims.

We claim:

1. An uncommitted memory identifier apparatus for identify uncommitted memory blocks in a memory device during an initialization procedure, the apparatus comprising:
   a test pattern identifier, coupled to read a first memory block within a system SRAM, that identifies a test pattern in the first memory block;
   a comparator, coupled to the test pattern identifier and coupled to read a second memory block contiguous to the first memory block, that compares the test pattern to a second pattern read from the second memory block to identify if the test pattern is repeating; and
   an uncommitted memory boundary identifier, coupled to the comparator, that defines start and end boundaries of an uncommitted memory space based on the comparison of the test pattern to the second pattern and at least one user-defined limit applied to an analysis of the system SRAM.

2. The uncommitted memory identifier apparatus of claim 1 further comprising a table of patterns and uncommitted memory that records the test pattern and location of the first memory block, the second pattern and the location of the second memory block, and the location of the uncommitted memory space.

3. The uncommitted memory identifier apparatus of claim 2 wherein data stored within table of patterns and uncommitted memory is used to restore the uncommitted memory space to its previous data state after a set of BIOS code has been stored and executed during an initialization procedure.

4. The uncommitted memory identifier apparatus of claim 1 wherein the comparator compares the test pattern to a third pattern read from a third memory block, that is contiguous to the second memory block, to identify if the test pattern continues to repeat.

5. The uncommitted memory identifier apparatus of claim 1 wherein the test pattern and second pattern are located within a conventional memory area within the system SRAM.

6. The uncommitted memory identifier apparatus of claim 5 wherein the conventional memory area is identified by a stack pointer in the system SRAM and is set prior to reading the test pattern.

7. The uncommitted memory identifier apparatus of claim 1 wherein the length of the test pattern and second pattern is a dword.

8. The uncommitted memory identifier apparatus of claim 1 wherein the length of the test pattern and second pattern is a qword.

9. The uncommitted memory identifier apparatus of claim 1 wherein BIOS code is stored within the identified uncommitted memory space and executed according to control software.

10. A method for identifying uncommitted memory space within a memory device, the method comprising:
    defining a set of criteria applied to an analysis of the memory device that establishes at least one parameter from which uncommitted memory space may be identified;
    reading a test pattern from a first memory block within the memory device;
    reading a second pattern from a second memory block that is contiguous to the first memory block;
    comparing the test pattern to the second pattern to determine whether the test pattern and second pattern are the same; and
    identifying a combination of the first and second memory blocks as uncommitted memory space if the test pattern and the second pattern are the same and the size of the combination is above threshold value.

11. The method of claim 10 further comprising the steps of:
    reading a third pattern from a third memory block that is contiguous to the second memory block if the test pattern and the second pattern are the same;
    comparing the test pattern to the third pattern to determine whether the test pattern and the third pattern are the same; and
    wherein the uncommitted memory space is a combination of the first, second and third memory blocks if the test pattern and the third pattern are the same.

12. The method of claim 11 wherein the first and second memory blocks are located within a conventional memory area of the memory device.

13. The method of claim 11 further comprising the step of creating a table that stores the address of the first memory block and test pattern, the address of the second memory block and second pattern, and the location of the uncommitted memory space.

14. The method of claim 13 wherein the table is used to restore the uncommitted memory space to its previous data state after a set of BIOS code has been stored and executed during an initialization procedure.

15. The method of claim 11 wherein the length of the first memory block and the second memory block is a dword.

16. The method of claim 11 wherein the length of the first memory block and the second memory block is a qword.

17. The method of claim 11 wherein the identification of the test pattern and comparison of the test pattern to the second pattern is performed throughout an entire conventional memory area within the memory device.

18. A computer program product embodied on a computer readable medium for identifying uncommitted memory space within a memory device, the computer program product comprising computer instructions for:
    defining a set of criteria applied to an analysis of the memory device that establishes at least one parameter from which uncommitted memory space may be identified;
    reading a test pattern from a first memory block within the memory device;
    reading a second pattern from a second memory block that is contiguous to the first memory block;
    comparing the test pattern to the second pattern to determine whether the test pattern and second pattern are the same; and
    identifying a combination of the first and second memory blocks as uncommitted memory space if the test pattern and the second pattern are the same and the size of the combination is above threshold value.

19. The computer program product of claim 18 further comprising computer instructions for:
    reading a third pattern from a third memory block that is contiguous to the second memory block if the test pattern and the second pattern are the same;
    comparing the test pattern to the third pattern to determine whether the test pattern and the third pattern are the same; and
    wherein the uncommitted memory space is a combination of the first, second and third memory blocks if the test pattern and the third pattern are the same.

20. The computer program product of claim 18 further comprising computer instructions for creating a table that stores the address of the first memory block and test pattern, the address of the second memory block and second pattern, and the location of the uncommitted memory space.

21. The computer program product of claim 20 wherein the table is used to restore the uncommitted memory space to its previous data state after a set of BIOS code has been stored and executed during an initialization procedure.

22. The computer program product of claim 18 wherein the identification of the test pattern and comparison of the test pattern to the second pattern is performed throughout an entire conventional memory area within the memory device.

* * * * *